United States Patent

Van Romer et al.

[11] Patent Number: 5,928,751
[45] Date of Patent: Jul. 27, 1999

[54] DRIP BERM

[75] Inventors: Glenn P. Van Romer, Clemson; Kurt Johnson, Anderson, both of S.C.

[73] Assignee: Basic Concepts, Inc., Anderson, S.C.

[21] Appl. No.: 09/112,931

[22] Filed: Jul. 9, 1998

[51] Int. Cl.[6] .................................................. B32B 3/10
[52] U.S. Cl. ........................ 428/68; 428/136; 428/74; 180/69.1; 184/106
[58] Field of Search ............................. 428/68, 74, 136; 180/69.1; 184/106

[56] References Cited

U.S. PATENT DOCUMENTS

| | | | |
|---|---|---|---|
| 2,986,235 | 5/1961 | Weibert, Jr. | 184/106 |
| 3,062,323 | 11/1962 | Oganovic | 184/106 |
| 3,141,522 | 7/1964 | Fitzpatrick | 184/106 |
| 4,577,713 | 3/1986 | Moon | 180/69.1 |
| 4,671,024 | 6/1987 | Schumacher | 52/2 |
| 4,709,826 | 12/1987 | Wong | 220/1 |
| 4,798,754 | 1/1989 | Tomek | 428/74 |
| 5,020,638 | 6/1991 | Smith | 184/106 |
| 5,404,848 | 4/1995 | Nelson | 123/198 |
| 5,642,834 | 7/1997 | Shaw et al. | 220/720 |
| 5,711,402 | 1/1998 | Sumpter, Sr. | 184/106 |

*Primary Examiner*—Alexander Thomas
*Attorney, Agent, or Firm*—Henry S. Jaudon; Cort Flint

[57] ABSTRACT

A flexible lightweight drip berm comprising a pillow having an inner area which receives a hydrocarbon absorbing pad. A opening in the upper surface allows access to the pad and inner area. A retractable screen secures and protects the pad while allowing entry of hydrocarbon material. A lower pocket is provided to retain weighted material when necessary.

13 Claims, 3 Drawing Sheets

DRIP BERM

BACKGROUND OF THE INVENTION

The Environmental Protection Agency now requires that hydrocarbons, such as oil, not be allowed to spill or drip onto the ground where it contaminates the soil and underground water systems. This invention is directed to a drip berm for use beneath vehicles, machinery and storage containers to catch and retain oil spilled therefrom. The berm is designed to have a low profile so as to be unobtrusive and to be easily transported.

Drip catchers are well known. Most have many obvious drawbacks. For example, drip catchers such as disclosed in U.S. Pat. Nos. 5,404,848 and 5,711,402 to Nelson and Sumpter disclose a non-flexible drip pan. These devices are bulky, have a tendency to crack, cannot conform with the topography, and in some instances are not acceptable material for landfills.

Drip catchers such as shown in U.S. Pat. Nos. 3,141,522 and 4,798,754 to Fitzpatrick and Tomek do not have a replaceable absorbing member and must be discarded when saturated.

It is the primary object of this invention to provide a drip berm which is lightweight, sturdy, flexible and includes an absorbing pillow.

Another object of the invention is to provide a drip berm constructed for easy storage.

Another object of the invention is an inexpensive drip berm.

Another object of the invention is to provide a drip berm of adjustable weight.

Another object of the invention is to provide a drip berm formed of material acceptable in landfills.

Another object of the invention is to provide a drip berm which includes a case which allows replacement of the absorbing pillow.

Another object of the invention is to provide a drip berm which is equally adaptable inside and outside.

Another object of the invention is to provide a drip berm which conforms with the topography.

SUMMARY OF THE INVENTION

The instant invention is directed to a drip berm for receiving and retaining spilled or dripped hydrocarbons and other fluids thereby preventing their adsorption into the ground or water systems. The berm comprises a case which includes a floor layer, an upper layer, and a lower layer. The case is preferably formed of non-porous polyvinyl chloride sheet material or polyurethane or other film formers which are flexible and may be reinforced or unreinforced.

The outer peripheral edges of the upper layer, the floor layer, and the lower layer are sealed together with a non-porous seal forming an inner area. The upper layer includes an open area which is defined by four inner edges. The open area allows access to the inner area.

A pillow which may be formed of hydrocarbon only absorbing material or of an all fluid absorbing material, is positioned within the inner area. The pillow is sized to fill the inner area.

A screen, formed of monofilament polyvinyl chloride, is attached along one of its edges adjacent an inner edge and on the inner side of the upper layer. The attachment means is preferably a heat seal.

The screen is sized so that its outer edges extend slightly beyond the inner edges of the upper layer. The screen may be positioned to secure the pillow in the inner area by positioning its unsecured outer edges below the inner edges of the upper layer. The screen may also be folded back along the seal line allowing access to the inner area so that pillows when saturated may be replaced.

A pocket is formed between the lower surface of the floor and the lower surface. A slit is formed in the lower layer to allow access to the pocket. The slit may be closed by causing edges forming the slit to overlap.

The pocket is provided to receive anchoring material such as sand, rocks, etc. which will act to retain the berm in position.

BRIEF DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
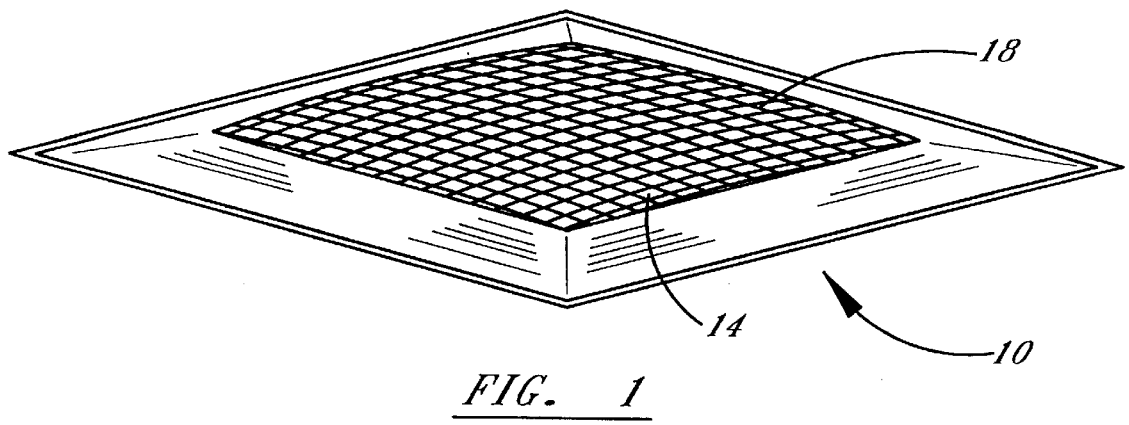
FIG. 1 is a perspective view of the drip berm of the invention.
Figure 2:
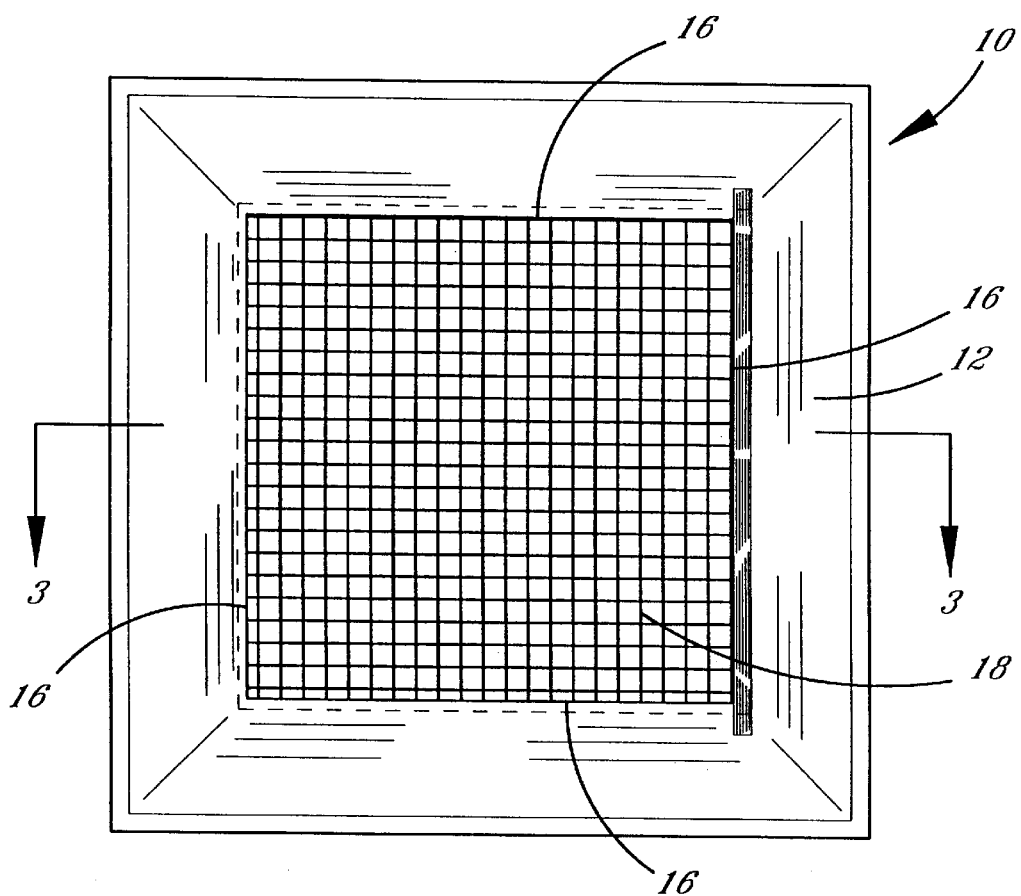
FIG. 2 is a top view of the drip berm of the invention.
Figure 3:
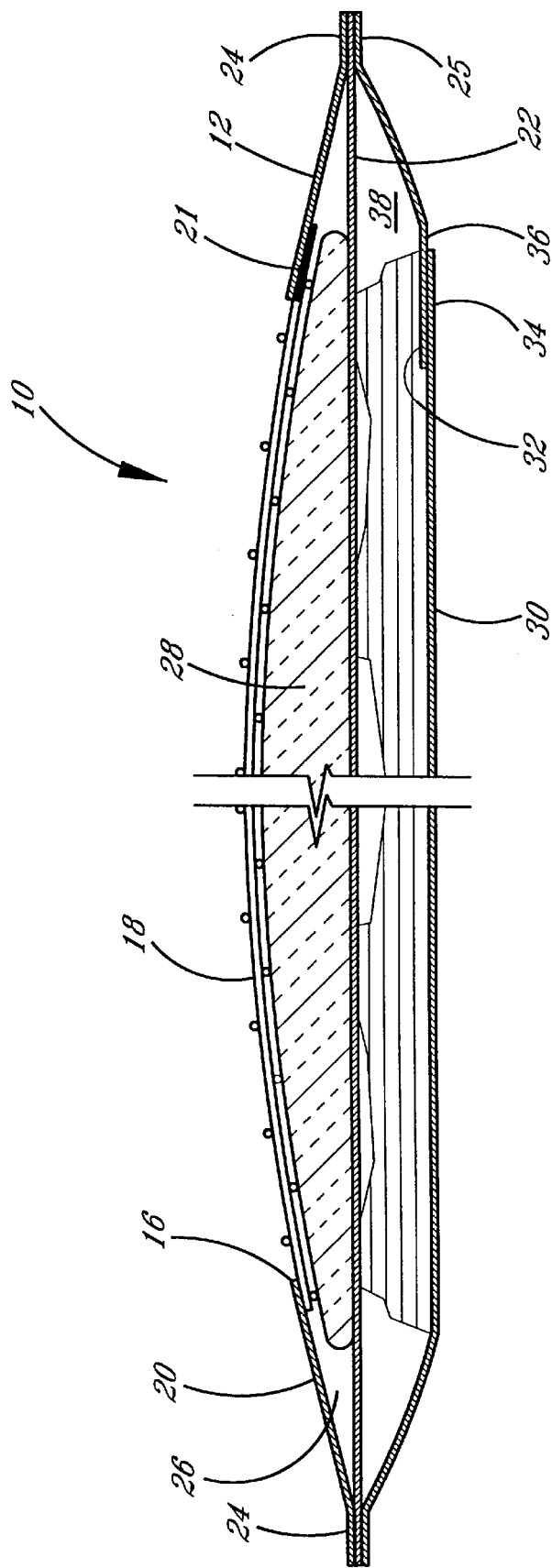
FIG. 3 is a sectional side view along lines 3—3 of FIG. 2.

Referring now to FIGS. 1–3, the drip berm of the invention is shown to have a substantially rectangular configuration. The berm includes an outer case 10 having an upper layer 12 formed with an open area 14 defined by inner edges 16. A screen 18 is positioned to cover open area 14 to help keep debris from getting into the open area and to retain an absorbent pad in position, to be described later.

Upper layer 12 is preferably formed of non-porous polyvinyl chloride sheet material which may or may not be fiber reinforced. Polyurethane and other film formers may also be suitable for forming layer 12.

Screen 18 is formed of polyvinyl chloride monofilament which is interlaced by weaving, braiding, or other known methods to form a grid type fabric. The screen is preferably coated with a polyvinyl chloride film to stabilize the position of the forming filaments.

Figure 4:
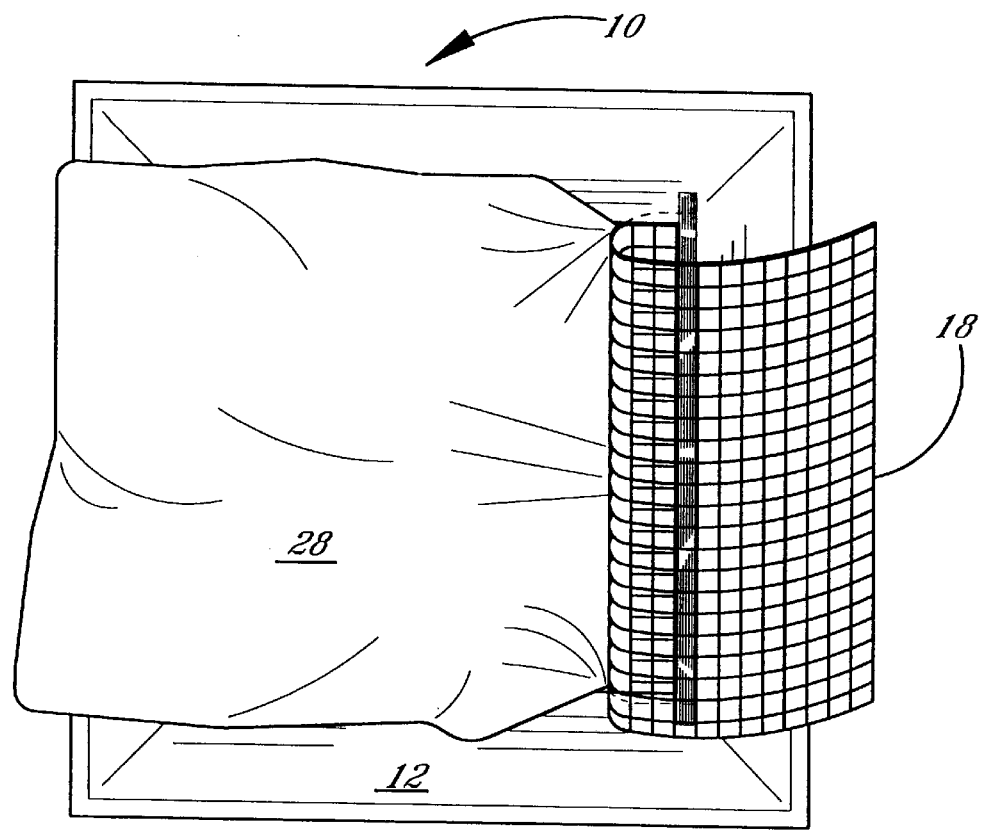
FIG. 4 is a top view showing the screen retracted and the pillow partially within the pocket.

As best seen in FIGS. 2–5, screen 18 is sized to be slightly larger than opening 14. In its working position, outer edges 20 are positioned beneath inner edges 16 and extend a short way beneath upper layer 12. A selected outer edge 20 is secured with the underside of upper layer 12 with a weld 21. This permanently connects screen 18 with top layer 12 while allowing it to be folded back, as shown in FIG. 4, exposing the pad and inner area.

Figure 5:
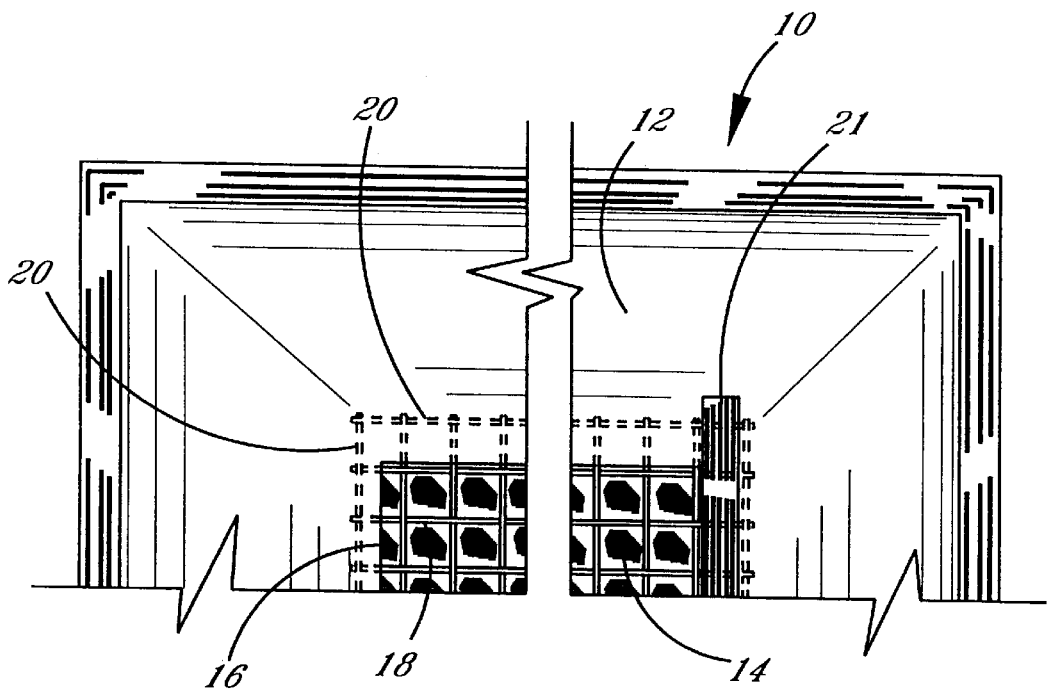
FIG. 5 is a sectional top view showing the screen edges beneath the inner edges of the top layer.

Turning now to FIGS. 3–5, case 10 further includes a floor layer 22, formed also of non-porous polyvinyl chloride sheet material. Floor layer 22 is positioned beneath upper layer 12 and is secured therewith by a non-porous weld 24 which extends about the periphery of both layers. An inner area 26 is formed between the upper layer and the floor layer.

An absorbent pad 28 is positioned in inner area 26 to rest on floor layer 22 and beneath inner edges 16 and upper layer 12. Screen 18, when positioned as shown in FIGS. 2 and 3 retains pad 28 in position. Screen 18 also allows oil or other liquid hydrocarbons to pass through upper area 12 into inner area 26 to be absorbed by pad 28.

Pad 28 which is designed as hydrocarbon absorbent is a commercially available product and is usually formed of polyolefm or cellulose. The pad also may be designed to absorb all water-soluble fluids.

Case 10 is designed to allow replacement of pad 28 when it becomes saturated. This is done by simply lifting or folding back screen 18, as shown in FIG. 4, removing the saturated pad and replacing it with a fresh one. Screen 18 is re-positioned, as shown in FIGS. 2 and 3 which secures the fresh pad in position.

Lower layer 30, which is formed also of a non-porous flexible polyvinyl chloride sheet, is positioned beneath floor layer 22 and is secured therewith about its periphery by way of weld 25. Pocket 38 is formed between lower layer 30 and the lower surface of floor layer 22. A slit 36 is formed across lower layer 30 to provide access into pocket 38. Slit 36 may be formed between ends 32 and 34 which overlap and normally maintain the slit closed.

Pocket 38 is provided to receive weighted material 40 which may be sand, small rock, or metal pieces. The weighted material acts to stabilize or anchor the berm when it is used out of doors or in other conditions where weight is necessary.

Another arrangement for anchoring the drip berm in position would be to provide corner grommets in case 10 providing a tie down capacity.

While polyvinyl chloride sheets are preferred because of their strength, durability, resiliency, and resistance to hydrocarbons, other materials, which may include polyurethanes, and which meet this criteria may be used. Polyvinyl chloride is also acceptable in landfills.

Welds 24, 25, and 22 are preferably heat welds, however other securing arrangements are acceptable such as glue welds.

In use the described berm is lightweight, has a low profile, is flexible to conform with the topography, and is easily shipped or stored. The case is reusable while the pad is replaceable. The berm may be sized to receive and house all commercially available absorbent pillows or as required dependent upon the intended use. The most desired size is 22"×22".

While a preferred embodiment of the invention has been described using specific terms, such description is for illustrative purposes only, and it is to be understood that changes and variations may be made without departing from the spirit or scope of the following claims.

What is claimed is:

1. A drip berm comprising:

a case having a floor layer and an upper layer, said floor layer and said upper layer being united about their peripheral edges with a non-porous seal forming an inner area;

said upper layer having a central open area over a major portion thereof, said open area being defined by a plurality of inner edges;

a pad disposed within said inner area, said pad being capable of absorbing hydrocarbons;

a screen having a plurality of outer edges, said screen being secured along a first outer edge of said plurality of outer edges along a first inner edge of said plurality of inner edges, said screen being slightly larger than said open area so that said outer edges extend beyond said inner edges of said upper layer; whereby, said screen acts to access liquid into said inner area and to secure said pad within said inner area when said outer edges of said screen are beneath said inner edges of said upper layer and said screen allows removal of said pad from said inner area when folded back along said first outer edge.

2. The berm of claim 1 wherein said case is formed of non-porous flexible polyvinyl sheet material.

3. The berm of claim 2 wherein said upper layer and said floor layer are formed of reinforced polyvinyl chloride sheet material.

4. The berm of claim 1 wherein said screen is formed of interlaced monofilaments of polyvinyl chloride.

5. The berm of claim 4 wherein said screen is coated for stability.

6. The berm of claim 1 wherein said drip berm is generally rectangular.

7. The berm of claim 1 wherein each said edge of said drip berm is between 18" and 72" in length.

8. The berm of claim 1 wherein said case includes a lower layer, said lower layer forming a pocket between said bottom layer and said lower layer.

9. The berm of claim 8 wherein said lower layer includes an opening allowing access said pocket, said pocket being adapted to retain heavy material for anchoring said berm in position.

10. The berm of claim 1 wherein said case is formed of non-porous flexible polyurethane sheet material.

11. A flexible drip berm comprising:

a case formed of non-porous polyvinyl chloride sheet material having a upper layer, a floor layer and a lower layer, said layers being connected about their outer edges with a non-porous seal forming an inner area between said upper layer and said floor layer and a pocket between said floor layer and said lower layer;

said upper layer having a central open area defined by inner edges on said upper layer, said central open area allowing access to said inner area;

a pillow formed of hydrocarbon absorbing material positioned within said inner area;

said lower layer having a slit formed therein, said slit allowing access to said pocket; whereby, said pocket may be filled with heavy material which serves to anchor said berm in position.

12. The berm of claim 11 including a screen having a plurality of edges, said screen being attached along one edge of said plurality of edges along an edge of said inner edges, the remaining of said plurality of edges normally being positioned beneath said inner edges of said upper layer causing said screen to retain said pillow within said inner area.

13. The berm of claim 12 wherein said one edge of said screen is connected along said one inner edge of upper layer with a heat seal.

* * * * *